C. W. LEVALLEY.
NUT LOCK.
APPLICATION FILED DEC. 17, 1910.

1,009,909.

Patented Nov. 28, 1911.

Witnesses
J. P. Connor
L. C. Brady

Inventor
C. W. Levalley
By John S. Barker
his Attorney

COLUMBIA PLANOGRAPH CO., WASHINGTON, D. C.

UNITED STATES PATENT OFFICE.

CHRISTOPHER W. LEVALLEY, OF MILWAUKEE, WISCONSIN.

NUT-LOCK.

1,009,909.

Specification of Letters Patent.

Patented Nov. 28, 1911.

Application filed December 17, 1910. Serial No. 597,813.

*To all whom it may concern:*

Be it known that I, CHRISTOPHER W. LEVALLEY, a citizen of the United States, residing at Milwaukee, in the county of Milwaukee and State of Wisconsin, have invented certain new and useful Improvements in Nut-Locks, of which the following is a specification.

My invention relates to nut locks and has for its object to produce a device of this character that will secure a nut in place under conditions of severe use, that is simple and inexpensive in construction, and that can be repeatedly used.

Figure 1:
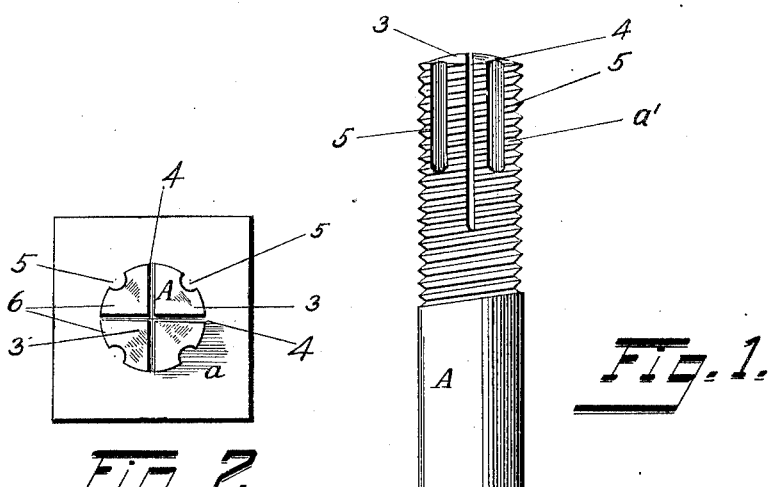
Figure 2:
Figure 3:
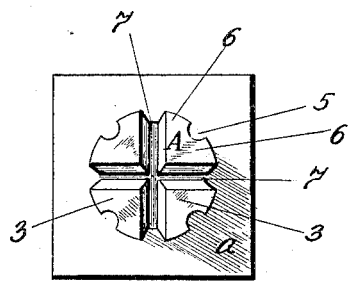
Figure 5:
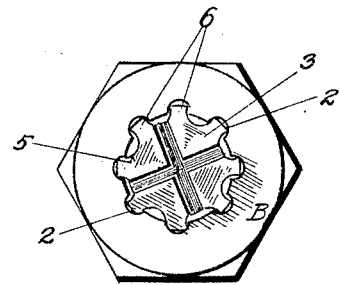
Figure 4:
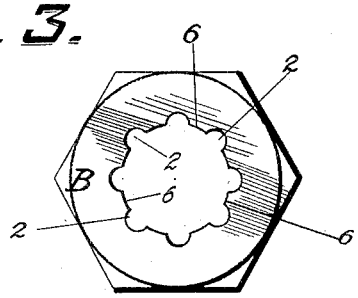

In the accompanying drawings: Figure 1 is an elevation of a bolt made according to my invention. Fig. 2 is an end view of the same. Fig. 3 is an end view of the bolt, its locking parts being spread or arranged in locking position. Fig 4 is a face view of a nut made according to the present invention and adapted to be used in connection with the bolt shown in the figures already described. Fig. 5 is an end view of the bolt and nut shown in the other views, the parts being in locked position.

Referring to the drawings A represents a bolt provided with a head $a$ of any desired shape, and a screw-threaded portion $a'$.

B represents the nut adapted to engage with the threaded portion of the bolt A, the nut likewise being of desired configuration. The inner screw-threaded surface of the nut is provided with a series of recesses 2 communicating with its central aperture and formed by cutting away the material of the nut. The number of these recesses is preferably eight.

The screw-threaded end of the bolt is cut so as to form a set, preferably four, of locking gibs 3 adapted to be bent outward to engage with the recessed end or face of the nut, as indicated in Fig. 5. These gibs are formed by cutting through the threaded end of the bolt diametrical kerfs 4, preferably two of them, crossing each other at right angles at the longitudinal axis of the bolt. In the threaded peripheral faces of the segmental sections of the bolt, 3, produced by the kerfs 4, are formed longitudinal grooves 5, 5. The slitting of the bolt to form the gibs 3, and the production of the grooves 5, does not destroy or impair the cylindrical character of the bolt sufficiently to prevent the ready application of the nut to the bolt and its engagement therewith. After the nut has been screwed into place, and it is desired to lock it in such position, the sections 3 or locking gibs of the bolt are spread, as indicated in Figs. 3 and 5, by means of a wedge or suitable tool. When this has been done the shoulders of the locking gibs, on either side of the grooves 5, are caused to enter the recesses 2 in the nut; while the alternate portions of the nut, 6, that lie between contiguous grooves, occupy respectively the grooves 5 in the locking gibs, and the spaces 7 between such gibs formed by the widening of the kerfs 4 as the gibs are bent outward.

Should it be found necessary to remove a nut after being locked in the manner described, the gibs can be forced inward so as to occupy their original normal positions, indicated in Fig. 2, when the nut may be easily turned upon the bolt. The gibs may be repeatedly bent for locking a nut or permitting its removal, as conditions under which it is used may require.

What I claim is:—

1. In a nut lock, a bolt, the threaded end of which is divided by diametrical kerfs crossing each other at the axial center of the bolt, thus forming segmental sections adapted to be spread apart to form locking gibs, the said gibs being longitudinally grooved, in combination with a nut that engages the bolt, internally recessed to coöperate with the said locking gibs.

2. In a nut lock, the combination of a bolt, the threaded end of which is divided by diametrical kerfs crossing each other at the axial center of the bolt, forming segmental sections adapted to be bent outward to constitute locking gibs, such sections being longitudinally grooved, and a nut the inner screw-threaded surface of which is longitudinally recessed, whereby when the nut is applied to the bolt and the locking gibs are spread, there is interengagement between the latter and the nut, substantially as described.

3. In a nut lock, the combination of a bolt the threaded end of which is divided by a kerf thus forming segmental sections adapted to be spread apart, there being formed in the said sections longitudinal grooves which cut the threads, and a nut that engages with the bolt and is internally recessed to co-operate with the said grooved sections of the bolt when the latter are spread apart.

CHRISTOPHER W. LEVALLEY.

Witnesses:
W. C. FRYE,
C. L. LIEBAU.

Copies of this patent may be obtained for five cents each, by addressing the "Commissioner of Patents, Washington, D. C."